United States Patent [19]

Matsumura et al.

[11] Patent Number: 5,518,827
[45] Date of Patent: May 21, 1996

[54] INTERNAL REFORMING TYPE FUEL CELL DEVICE AND FUEL CELL GENERATING SYSTEM

[75] Inventors: Mitsuie Matsumura; Chika Hirai, both of Hyogo, Japan

[73] Assignee: Mitsubishi Denki Kabushiki Kaisha, Tokyo, Japan

[21] Appl. No.: 214,788

[22] Filed: Mar. 16, 1994

[30]  Foreign Application Priority Data

Apr. 28, 1993 [JP] Japan ................................. 5-123144

[51] Int. Cl.$^6$ ................................................. H01M 8/06
[52] U.S. Cl. .................................... 429/19; 429/20
[58] Field of Search ................ 429/19, 20; H01M 8/06

[56]  References Cited

U.S. PATENT DOCUMENTS

| | | | |
|---|---|---|---|
| 4,647,516 | 3/1987 | Matsumura et al. | 429/19 |
| 4,650,728 | 3/1987 | Matsumura et al. | 429/19 |
| 4,877,693 | 10/1989 | Baker | 429/20 X |
| 5,175,062 | 12/1992 | Farooque et al. | 429/20 |
| 5,348,814 | 9/1994 | Niikura et al. | 429/20 X |
| 5,426,002 | 6/1995 | Matsumura et al. | 429/20 |

FOREIGN PATENT DOCUMENTS

| | | | |
|---|---|---|---|
| 62-47968 | 3/1987 | Japan | H01M 8/06 |
| 3210774 | 9/1991 | Japan . | |

OTHER PUBLICATIONS

U.S. Ser. No. 08/117,698 issued Sep. 8, 1993 to Matsumura et al.
Tanaka, et al "Development of Internal Reforming Molten Carbonate Fuel Cell Stack", Mitsubishi Electric Corporation (Date Unknown).

*Primary Examiner*—Stephen Kalafut
*Attorney, Agent, or Firm*—Wolf, Greenfield & Sacks

[57]  ABSTRACT

An internal reforming type fuel cell device and a fuel cell generating system utilizing the fuel cell device whose reforming catalysts' lives are long, and whose characteristics are good, and further whose shapes are compact are provided. In the fuel cell device 14 holding reforming catalysts 11 in fuel gas passages 5 positioned at low temperature operating parts or the fuel cell generating system comprising the fuel cell device 14, a preparatory reforming part is arranged in an upper stream fuel gas system feeding a fuel gas to said fuel gas passages 5. As for the fuel cell generating system, a reforming reactor 18 is used as the preparatory reforming part.

20 Claims, 8 Drawing Sheets

Feeding of Fuel Gas
Feeding of Oxidized Gas
Exhausting of Fuel Gas
Exhausting of Oxidized Gas

INTERNAL REFORMING TYPE FUEL CELL DEVICE AND FUEL CELL GENERATING SYSTEM

BACKGROUND OF THE INVENTION

1. Field of the Invention

The present invention relates to an internal reforming type fuel cell device and a fuel cell generating system whose fuel gas is reformed by effects of reforming catalysts and that electric power is taken out by electrochemical reactions to the outside.

2. Description of the Prior Art

FIG. 1 is a perspective view showing a conventional internal reforming type fuel cell device in partly broken state shown in, for example Laying-Open Publication No. 13576 of 1986 filed in Japan. In FIG. 1, reference numeral 1 denotes a fuel gas electrode. Reference numeral 2 denotes an oxidant gas electrode. The fuel gas electrode 1 and the oxidant gas electrode 2 is arranged in opposing positions to each other through an electrolyte layer 3, and they compose a cell 4. Reference numeral 5 denotes a fuel gas passage arranged in an opposing state to the fuel gas electrode 1. Reference numeral 6 denotes an oxidant gas passage arranged in an opposing state to the oxidant gas electrode 2. Reference numeral 7 denotes a fuel gas side passage-forming material. Reference numeral 8 denotes an oxidant gas side passage-forming material. Reference numeral 9 denotes a separator plate for separating the fuel gas passages 5 and the oxidant gas passages 6 on the occasion of laminating plural cells 4, and for connecting the plural cells 4 in electrically series. Reference numeral 10 denotes a fuel cell stack laminating plural cells 4 through the separator plates 9. Reference numeral 11 denotes reforming catalysts held inside the fuel gas passages 5. In FIG. 1, the fuel gas passages 5 and the oxidant gas passages 6 are arranged in directions intersecting orthogonally with each other (a cross flow system). And, reference numeral 12 denotes a gas manifold for supplying and exhausting fuel gasses and oxidant gasses.

FIG. 2 is a system block diagram showing an outline of peripheral equipments for controlling fuel cells and the temperatures of the fuel cells in a fused carbonate type fuel cell generating system made public in a publication (American GRI report No. FCR-3522-2). In FIG. 2, reference numeral 14 denotes a fuel cell device. Reference numeral 15 denotes an turbine-compressor recovering power from an exhaust gas F exhausted from the fuel cell generating system. The turbine-compressor 15 also raises the pressure of ambient air E and feeds the pressurized air to the fuel cell generating system. Reference numeral 16 denotes a circulating blower circulating a part of oxidant gas D for the temperature control of the fuel cell device 14. Reference numeral 17 denotes a heat exchanger for the temperature control of an oxidant gas side circulating gas circulated by the circulating blower 16. Arrows A and B denote a fuel gas flow fed to and exhausted from the fuel cell device 14 respectively. And, arrows C and D denote oxidant gas flows.

The operation of the internal reforming type fuel cell and the fuel cell generating system shown in FIG. 1 and FIG. 2 respectively will now be described. In the case where steam and fuel such as hydrocarbon are fed in the fuel gas passage 5, the hydrocarbon reacts with the steam by a catalytic reaction with the reforming catalysts 11 and is transformed into hydrogen, carbon monoxide and carbon dioxide gas. In the case where the hydrocarbon is methane, this reaction is represented in the following equation (1):

$$CH4+H2O \rightarrow CO+3H2 \qquad (1)$$

Produced hydrogen and carbon monoxide pass through holes formed in the fuel-gas-side passage-forming material 7, and is diffused through pores of the porous fuel gas electrode 1. On the other hand, a mixed gas of air and carbon dioxide gas is fed to the oxidant gas passages 6 and it is diffused through pores of the porous oxidant gas electrode 2. Reactant gas whose principal components are said hydrogen and oxygen is consumed by an electrochemical reaction produced among carbonates, electrodes 1 and 2 and the reactant gas itself, where the carbonates are impregnated in the electrolyte layer 3 and are in a melted state near its operating temperature 650° C. Electric potential is established between electric current collectors (not shown in the Figures), and further electric power is taken out to the outside. Now, the reforming reaction produced on the reforming catalysts is an endothermic reaction. The quantity of heat needed to maintain this reaction is fed by the generated heat by said electrochemical reaction.

Generally, it is required for the steady state operation of fuel cells to remove generated heat in cell reactions by cooling. In the internal reforming type fuel cells, both of the cooling using the sensible heat of oxidant gases and the cooling using internal reforming reactions are used together. The temperatures of the fused carbonate type fuel cells are usually controlled near at an average temperature of 650° C. as a result of balancing the decrease of the corrosion amounts of cell construction materials by lowering an operating temperature and the improvements of cell performances by raising the operating temperature ("Handbook of Fuel Cell Performance", DOE Reports Contract of USA, No. EC-77-C-03-1545, May, 1980).

In the operation of the fuel cell devices, it is required to keep the temperatures of the fuel cell devices near said operating temperature by proper temperature control. Namely, thermal energy produced in the operation should be taken away in the steady-state operating condition for keeping the temperatures of the fuel cell devices. On the other hand, the heating of the fuel cell devices constant should be required on the contrary in case of holding on no load or in case of small load to prevent the temperature to decrease.

In case of the fused carbonate type fuel cells, a method circulating a heat medium in a gaseous state is popular as a temperature control method of the fuel cell device 14 for the purpose of the cooling and heating mentioned above. To put it concretely, the temperature of the fuel cell device 14 is controlled by recycling a part of the oxidant gasses through the heat exchanger 17 provided outside of the system. In FIG. 2, a part of the oxidant gas D is recycled to the fuel cell device 14 by the circulating blower 16 and it is utilized as a reaction gas and a cooling gas. The temperature of the fuel cell device 14 is controlled so as to meet the representative temperature of the fuel cell device 14 to a prescribed temperature condition by adjusting the flow rate and the temperature of the oxidant gas C with the operation of the circulation blower 16 and the heat exchanger 17.

A conventional and ordinal temperature control condition is as follows. That is, a large temperature distribution usually exists in a unit cell plane of the fuel cell device 14, for example, temperature range from a minimum value of about 570° C. to a maximum value of about 680° C. exists when the average temperature is about 650° C. Accordingly, the temperature of the fuel cell device 14 having such a large temperature distribution is controlled generally by introducing three reference temperatures, an upper limit temperature, a lower limit temperature and an average temperature, as follows.

1. The upper limit operating temperature is determined by the suppression of the corrosion of the cell construction materials (except for the reforming catalysts).
2. The lower limit operating temperature is determined by the prevention of electrolyte solidification or the improvements of cell characteristics.
3. The average operating temperature is a target average operating temperature as a whole fuel cell device.

The temperature control is executed by adjusting temperature control parameters such as the flow rate and the temperature of the oxidant gas C such that every temperature of the fuel cell device 14 measured by a temperature-measuring means, for example a thermocouple, meets the upper limit operating temperature and the lower limit operating temperature. Further, the temperature is controlled to bring the average operating temperature close to the target average operating temperature after obtaining the average operating temperature of the fuel cell device 14 from the measured temperatures of plural parts. In fused carbonate type fuel cell devices, for example, these temperatures are employed ordinary, namely, 650° C. as a target operating temperature, 680°–700° C. as an upper limit operating temperature, and 500°–540° C. as a lower limit operating temperature.

On the other hand, internal reforming type fuel cell device 14 holds reforming catalysts 11 in a fuel gas passages 5, but the reforming catalysts 11 are poor at heat resistance compared to other cell construction materials. The heat resistance of the reforming catalysts varies on the composition and the kinds of the reforming catalysts, the amounts of attached electrolyte, the composition of the fuel gas, and the like. According to our one embodiment, in case of Ni/MgO catalyst, the activity deterioration of the catalyst became remarkably larger by the operation of more than 5,000 hours in the fuel gas atmosphere containing electrolyte vapor under a temperature condition higher than 650° C. So, it is desirable to set the upper limitation operating temperature of the reforming catalyst to 630° C. or under the same temperature.

In conventional operating methods, one upper limit temperature and one lower limit temperature are set and applied to all operating regions of the fuel cell device 14. Accordingly, newly introducing reforming catalyst upper limit operating temperature (e.g. 630° C.) lower than the conventional upper limit operating temperature to the operating of the fuel cell device 14 requires to operate the fuel cell device 14 in an operating temperature wholly lowered by 50°–70° C. Consequently, the voltage of the stack decreases about 50–100 mV per unit cell average, and generating efficiency also decreases about 3.5–7%. As such large decreases of the cell voltage and the generating efficiency are not acceptable in practice, the concept of the reforming catalyst upper limit operating temperature is not applied actually, and the internal reforming cell is operated near an average operating temperature 650° C.

As mentioned above, conventional operating methods of the reforming type fuel cell devices needs the reforming catalysts kept in higher temperatures than 650° C. Especially, in case of a long operate, the activity deterioration of the reforming catalysts is remarkable. Therefore, the conventional operating methods have the defect that methane in fuel gas flowing in the fuel gas passages in a high temperature operating region becomes being not decomposed by the reforming catalysts and being exhausted from the fuel cell device to the outside of the system after a long operate. This fact was a large factor to lower the efficiency of the internal reforming cell and to determine the lifetime of it.

As the conventional fuel cell devices and the fuel cell generating systems is constructed as mentioned above, the enlargement of the undecomposed methane amounts in exhausted fuel gasses is inevitable with the passage of time due to the deterioration of the reforming catalysts held in the fuel gas passages in a high temperature region in the cell plane. Then, they had defects that the lifetime was short as an internal reforming cell, and the like. Besides, lowering the average operating temperatures of the fuel cell devices for the sake of the protection of the reforming catalysts caused such problems that cell voltages fell much and generating efficiencies fell.

SUMMARY OF THE INVENTION

An object of the present invention is to provide an internal reforming type fuel cell device the lifetime of whose reforming catalysts is long and the stable characteristics of which can be obtained for a long time without lowering the cell characteristics, and the setting and the controlling of whose part operating in lower temperatures become easy, and further the effectiveness of which can be exhibited at its maximum, the effectiveness concerning making the lifetimes of the reforming catalysts operating at low temperatures long.

Another object of the present invention is to provide an internal reforming type fuel cell device whose lower temperature operating parts can be set at most profit positions from the view points of cell characteristics and reforming reactions without causing the cell construction to be complicated, and which has simply constructed fuel cell units and which is stable for a long time.

Another object of the present invention is to provide a long life, high performance and compact internal reforming type fuel cell device which requires only one lower temperature operating part to be set in a cell plane, and which can set naturally the operating temperature of the lower temperature operating part to lower temperatures without lowering the average operating temperature.

Another object of the present invention is to provide a long life and high performance internal reforming type fuel cell device which has the large degree of freedom of the region-setting of lower temperature operating parts in the cell plane, and which requires only one lower temperature operating part at the fewest in the cell plane, and further which can set naturally the operating temperatures of the lower temperature operating parts to lower temperatures without lowering the average operating temperature.

Another object of the present invention is to provide a long life, high performance and compact internal reforming type fuel cell device which requires only one lower temperature operating part at the fewest to be set in a cell plane, and which can set naturally the operating temperatures of the lower temperature operating parts to lower temperatures without lowering the average operating temperature, and further which can execute efficient reformation utilizing exhausted heat.

Another object of the present invention is to provide a simply constructed, highly reliable, long life, high performance and compact internal reforming type fuel cell device which can construct its preparatory reforming part in a simple and highly reliable structure, and which requires only one lower temperature operating part to be set in a cell plane at the fewest in the plane, and further which can set naturally the operating temperatures of the lower temperature operating parts to lower temperatures without lowering average operating temperatures of the cell device.

Another object of the present invention is to provide a simply constructed, highly reliable, long life, high performance and highly efficient internal reforming type fuel cell device which can construct its preparatory reforming part in a simple and highly reliable structure, and which can execute reforming reactions efficiently by utilizing oxidant gas sensible heat in the preparatory reforming part, and which requires only one lower temperature operating part to be set in a cell plane at the fewest in the plane, and further which can set naturally the operating temperatures of the lower temperature operating parts to lower temperatures without lowering average operating temperatures of the cell device.

Another object of the present invention is to provide a fuel cell generating system capable of operating an internal reforming type fuel cell device in a long life and high performance state, said fuel cell generating system capable of requiring only one lower temperature operating part to be set in a cell plane at the fewest in the plane, and further capable of setting naturally the operating temperatures of the lower temperature operating parts to lower temperatures without lowering average operating temperatures of the cell device.

Another object of the present invention is to provide a fuel cell generating system having high generating efficiency and capable of operating an internal reforming type fuel cell device in a long life and high performance state, said fuel cell generating system capable of requiring only one lower temperature operating part to be set in a cell plane at the fewest in the plane, and capable of setting naturally the operating temperatures of the lower temperature operating parts to lower temperatures without lowering average operating temperatures of the cell device, and further capable of executing the reforming reactions of fuel gasses efficiently by utilizing exhausting heat.

To attain the objects mentioned above, the internal reforming type fuel cell device of a first aspect of the present invention is constituted so as to touch a fuel gas to reforming catalysts arranged in low temperature operating parts by arranging the reforming catalysts in fuel gas flowing spaces positioned at low temperature operating parts produced by temperature distributions in a cell plane, and the internal reforming type fuel cell device is constituted in order that the flow direction of the fuel gas flowing in fuel gas passages and the flow direction of an oxidant gas flowing in oxidant gas passages is in a parallel relation or in an opposing relation.

As the internal reforming type fuel cell device of the first aspect of the present invention arranges the reforming catalysts in the fuel gas passages in the low temperature operating parts, the activity of the reforming catalysts is maintained for a long time without the deterioration of cell characteristics. Further, the flow directions of the fuel gas and the oxidant gas are in the parallel relation or the opposing relation, so the temperature distributions, forming the low temperature operating parts, in the fuel cell device becomes one dimension in a reaction gas direction.

The internal reforming type fuel cell device of a second aspect of the present invention is constituted by connecting plural fuel cell device units in series to each other in the flow direction of a fuel gas, and the internal reforming type fuel cell device is constituted to hold reforming catalysts in fuel gas flowing spaces positioned in low temperature operating parts in at least one and more fuel cell device units.

As the internal reforming type fuel cell device of the second aspect of the present invention connects plural fuel cell device units in series to each other in the flow direction of the fuel gas, and holds the reforming catalysts in the low temperature operating parts in at least one and more fuel cell device units, the internal reforming type fuel cell device can set the low temperature operating parts to the most suitable positions without complexing the cell structures, and can realize an internal reforming type fuel cell device simple in structure and stable over a long period of time.

The internal reforming type fuel cell device of a third aspect of the present invention is constituted so as to touch a fuel gas to reforming catalysts arranged in low temperature operating parts by arranging the reforming catalysts in fuel gas flowing spaces positioned at low temperature operating parts produced by temperature distributions in a cell plane, and the internal reforming type fuel cell device is provided with a preparatory reforming part in the fuel cell device and constituted to introduce the fuel gas provided from the outside to the preparatory reforming part at first, and after that it is constructed to introduce the fuel gas to fuel gas passages.

The internal reforming type fuel cell device of the third aspect of the present invention introduces the fuel gas to the preparatory reforming part provided inside the fuel cell device and touch the fuel gas to the reforming catalysts arranged in the low temperature operating parts after reforming the fuel gas in the preparatory reforming part. Accordingly, only one lower temperature operating part to be set in a cell plane is required at the fewest in the plane, and the operating temperatures of the lower temperature operating part can set naturally to lower temperatures without lowering average operating temperatures of the cell device.

The internal reforming type fuel cell device of a fourth aspect of the present invention is constituted to keep low temperature operating parts in low temperatures by endothermic effects of reforming reactions proceeding in a preparatory reforming part.

The internal reforming type fuel cell device of the fourth aspect of the present invention arranges reforming catalysts in fuel gas flowing spaces positioned low temperature operating parts produced by the cooling effects of the preparatory reforming part, and then the internal reforming type fuel cell device can make the fuel gas touch the reforming catalysts positioned in the low temperature operating parts. Therefore, a long life and high performance internal reforming type fuel cell device can be obtained, the internal reforming type fuel cell device having the large degree of freedom of region-setting of the low temperature operating parts in a cell plane, and requiring only one place in a cell plane in the fewest, and further being able to set the operating temperatures of the low temperature operating parts to low temperatures naturally without lowering the average operating temperatures of the cell.

The internal reforming type fuel cell device of a fifth aspect of the present invention is constructed to introduce a fuel gas fed from the outside to preparatory reforming parts at first, after that it is constructed to introduce the fuel gas to fuel gas passages, and further to execute reforming reactions in the preparatory reforming parts by using exhausted heat accompanied with fuel cell reactions.

The internal reforming type fuel cell device of the fifth aspect of the present invention can execute the reforming reactions of the fuel gas in the preparatory reforming parts by using the exhausted heat produced in the fuel cell device. Accordingly, only one low temperature operating part to be set in a cell plane in the fewest is required, and the operating temperature in the low temperature operating part can be set naturally to the low temperatures without lowering the average operating temperature of the cell.

The internal reforming type fuel cell device of a sixth aspect of the present invention is provided with a preparatory reforming part inside entrance side gas-leading fuel gas passages leading a fuel gas from a gas manifold to fuel gas passages adjacent to a fuel gas electrode, and the internal reforming type fuel cell device is constructed to introduce a fuel gas fed from the outside to the preparatory reforming part at first and to lead the fuel gas to the fuel gas passages after that.

As the internal reforming type fuel cell device of the sixth aspect of the present invention is provided with the preparatory reforming part inside the entrance side gas,leading fuel gas passages, the internal reforming type fuel cell device can obtain the preparatory reforming part in a simple and highly reliable structure, and it requires only one lower temperature operating part to be set in a cell plane at the fewest in the plane, and further it can set the operating temperature of the lower temperature operating part to lower temperatures naturally without lowering average operating temperature of the cell device.

The internal reforming type fuel cell device of a seventh aspect of the present invention is constructed in order that a preparatory reforming part and gas-leading oxidant gas passages are in heat-exchanging relation, and the internal reforming type fuel cell device is constructed to feed reforming reaction heat required to reforming reactions from an oxidant gas flowing in the gas-leading oxidant gas passages.

The internal reforming type fuel cell device of the seventh aspect of the present invention can execute the reforming reactions with heat-exchanging with the high temperature oxidant gas flowing the gas-leading oxidant gas passages in entrance side gas-leading fuel gas passages in the preparatory reforming part. Accordingly, the preparatory reforming part can be made to be simple and highly reliable, and the reforming reactions can be done efficiently in the preparatory reforming part. Besides, a low temperature operating part to be set in a cell plane is not required more than one place in the plane in the fewest, and then an operating temperature of the low temperature operating part can be set naturally to a low temperature without lowering the average temperature of the cell.

The fuel cell generating system of an eighth aspect of the present invention is constructed to provide a reforming reactor to a fuel gas system feeding a fuel gas to a fuel cell device.

The fuel cell generating system of the eighth aspect of the present invention introduces the fuel gas to the reforming reactor provided at the upper stream side of the fuel gas system of the fuel cell device, and after reforming the fuel gas in the reforming reactor, the fuel cell generating system touch the fuel gas to reforming catalysts arranged at low temperature operating parts. Accordingly, the low temperature operating part to be set in a cell plane is not required more than one place in the plane in the fewest, and then an operating temperature can be set naturally to a low temperature without lowering the average temperature of the cell.

The fuel cell generating system of a ninth aspect of the present invention is constructed to provide a reforming reactor to a fuel gas system feeding a fuel gas to a fuel cell device, and is constructed to feed exhausted heat produced in the fuel cell device to the reforming reactor.

As the fuel cell generating system of the ninth aspect of the present invention is constructed to feed reaction heat required to reforming reactions in the reforming reactor from the exhausted heat produced in the fuel cell device, the fuel gas is efficiently reformed by utilizing the exhausted heat.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

EMBODIMENT 1.

The embodiments of the present invention will be described in connection with the accompanying drawings hereinafter.

Figure 3:
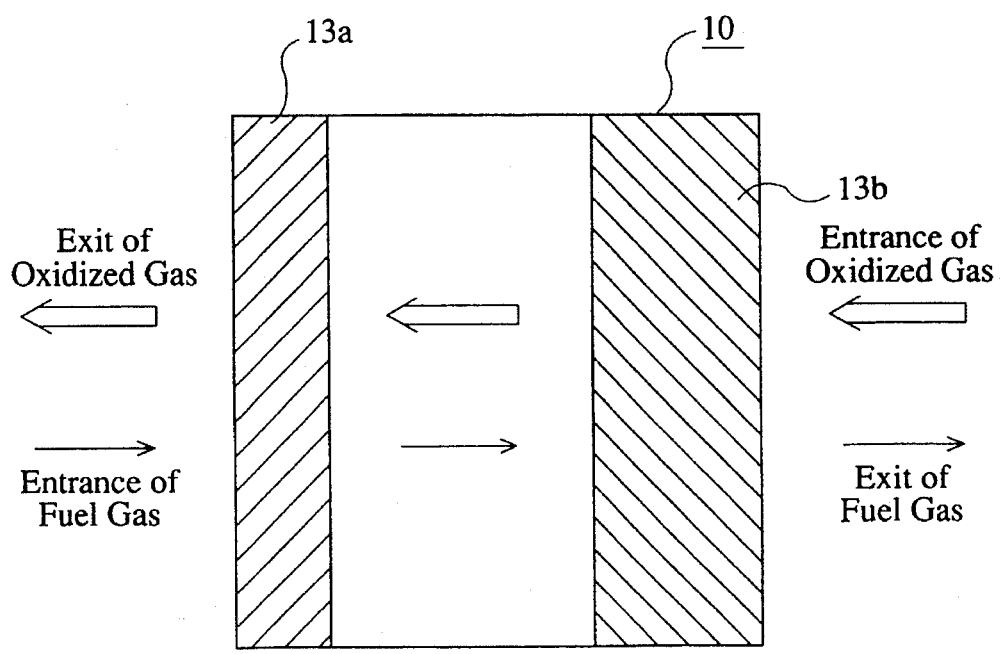
FIG. 3 is an illustrative view illustrating the embodiment 1 of the internal reforming type fuel cell device of the present invention.
Figure 4:
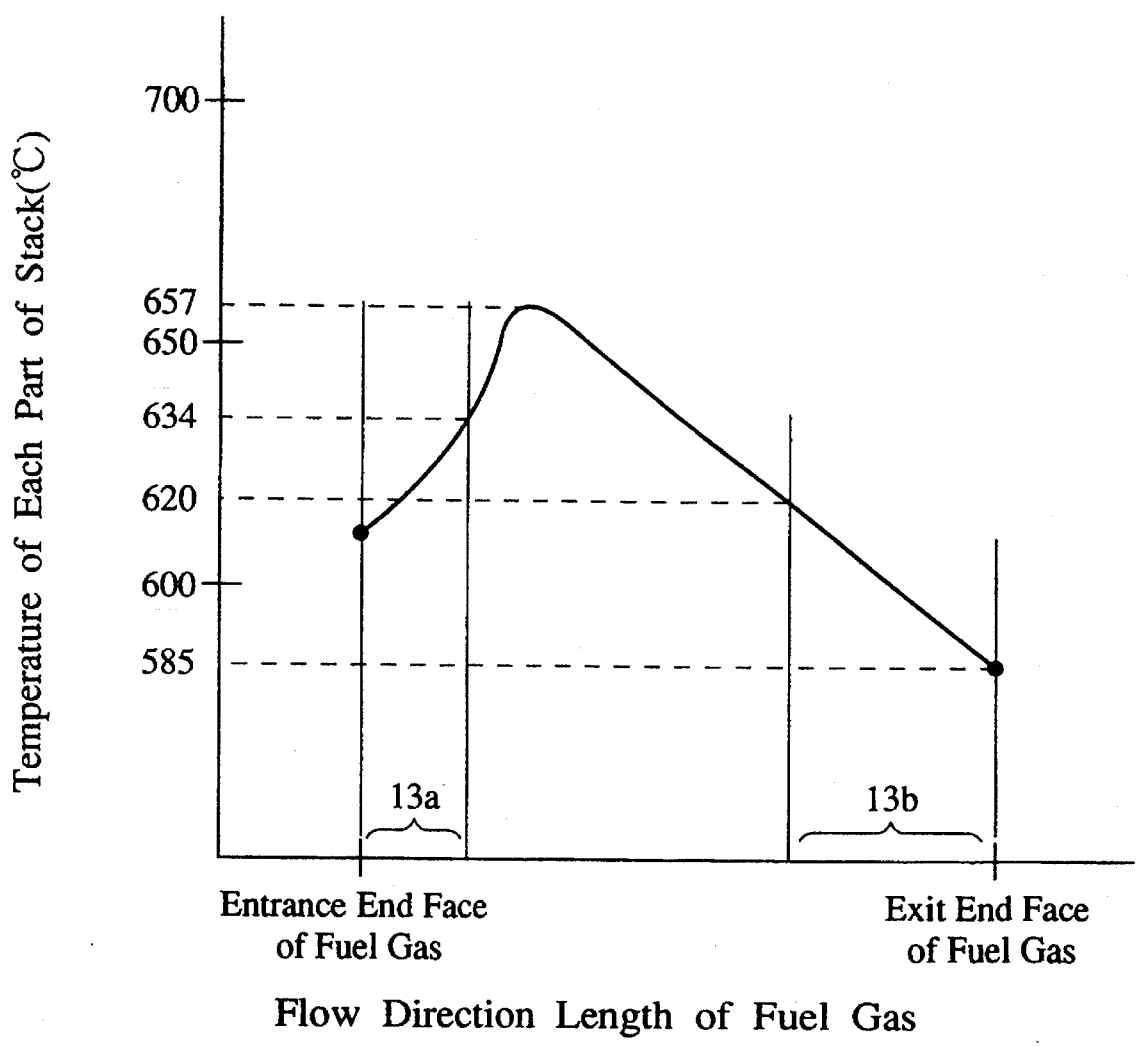
FIG. 4 is an illustrative view illustrating an example of a temperature distribution in a cell plane of the embodiment 1 of the internal reforming type fuel cell device of the present invention.

FIG. 3 is a sectional view of a fuel cell stack in a cell plane of the internal reforming type fuel cell device of the present invention. In FIG. 3, reference numeral 10 denotes a fuel cell stack. Reference numeral 13*a* and 13*b* denote low temperature operating parts (oblique-lines-drawn regions in the same FIG.) produced by a temperature distribution in a cell plane. Reforming catalysts (not shown in the same Fig.) are held in fuel gas passages positioned in the low temperature operating parts 13*a* and 13*b*. As shown by the arrows of FIG. 3, the fuel cell stack 10 employs a gas feed structure of an opposing flow method in which the flow direction of a fuel gas and the flow direction of an oxidant gas are opposed to each other. FIG. 4 shows an example of a temperature distribution in a flow direction of the fuel gas in a fuel cell device employing the gas feed structure of the opposing flow method.

Next, the operation of the embodiment 1 will be described.

Figure 1:
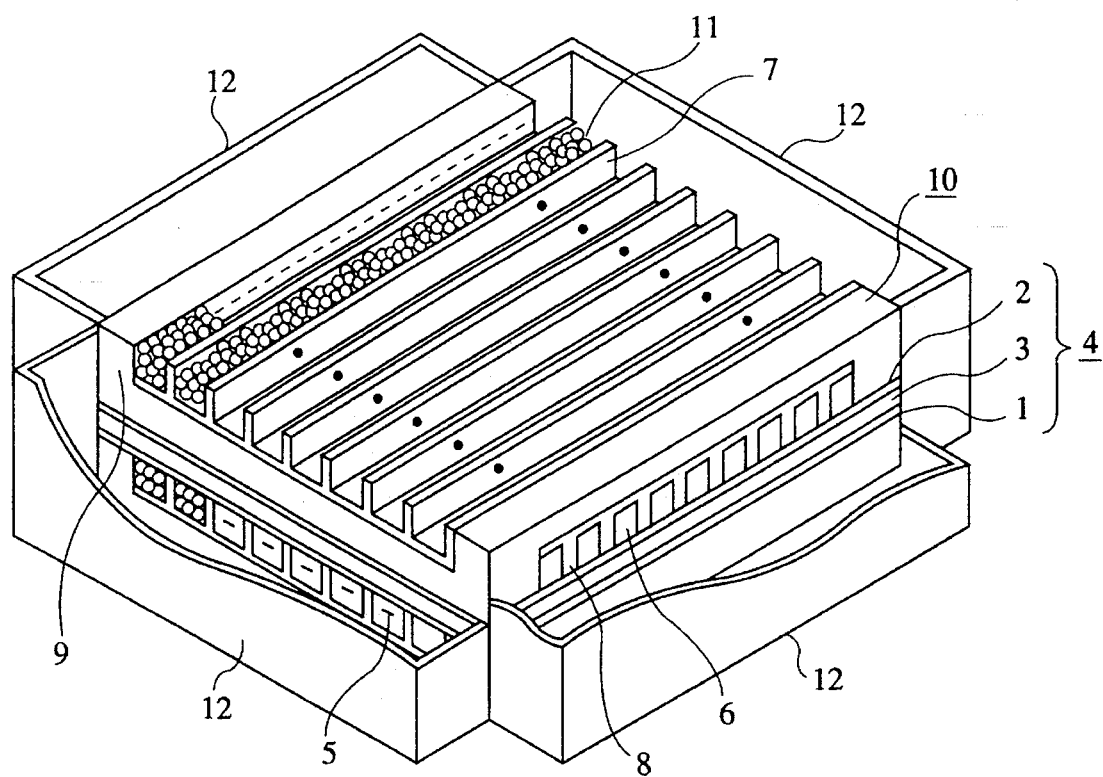
FIG. 1 is a partial cross sectional perspective view of a conventional internal reforming type fuel cell device.

In case of the internal reforming type fuel cell device, the cooling of the fuel cell device is done mainly by endothermic effects accompanied with the reforming reactions of raw fuel of a hydrocarbon or alcoholic kinds and by cooling effects of sensible heat of a reaction gas (generally an oxidant gas). Now, the endothermic amounts accompanied with the reforming reactions are determined by the fed amounts of the raw fuel, and the fed amounts of the raw fuel are determined almost definitely by amounts of electricity (electrochemical reaction amounts) taken out from the fuel cell device. Accordingly, endothermic effects by the reforming reactions are hard to become parameters adjusting average operating temperatures, temperature distributions and the like of the fuel cell device. From this reason, the temperature adjustments of the fuel cell device are ordinary done by adjusting entrance temperatures of the oxidant gas to the fuel cell device or by adjusting gas feed amounts. And in case of the internal reforming cell device, a fuel gas entrance part of the fuel cell stack and an oxidant gas entrance part become low temperature parts in a cell plane under a constant load operating condition, so these two parts are made to be the low temperature operating parts 13$a$ and 13$b$. And, FIG. 4 is an example of temperature distribution in a cell plane on a constant load operating (150 mA /cm$^2$) when the fuel cell device is operated under the condition that the upper limit operating temperature of the low temperature operating parts 13$a$ and 13$b$ is less than the reforming catalyst upper limit operating temperature (set at 630° C. in this case). As shown in the same Fig., the average temperature of the cell plane is about 630° C., and the maximum temperature is about 657° C. However, the maximum temperature is 634° C. in the low temperature operating part 13$a$, and the maximum temperature is about 620° C. in the low temperature operating part 13$b$. These maximum temperatures in the low temperature operating parts 13$a$ and 13$b$ are kept less enough than the reforming catalyst upper limit operating temperature. Accordingly, the activity of the reforming catalysts 11 held in fuel gas passages 5 (both of them are shown in FIG. 1) positioned in the low temperature operating parts 13$a$ and 13$b$ is kept stable for a long time. As mentioned above, the embodiment 1 can set the low temperature operating parts 13$a$ and 13$b$ whose temperature ranges are from about 585° C. to about 630° C. at the fuel gas entrance part and the oxidant gas entrance part by utilizing existing temperature distributions without lowering the average operating temperature in the cell plane.

For the reference, applying the reforming catalyst upper limit operating temperature (630° C.) to the fuel cell device in a conventional operating method brings about following results. That is, the same upper limit operating temperature is applied to the whole areas of the cell plane in the conventional operating method, but the average temperature of the fuel cell device in the embodiment shown in FIG. 4 is required to be lowered further by about 27° C. for suppressing the maximum temperature less than the reforming catalyst upper operating temperature (e.g. 630° C.). However, such a large fall of the average operating temperature brings about the fall of fuel cell device characteristics, then such a operate is practically impossible.

Further, the heat resistance of the reforming catalysts differs much according to the compositions and kinds of the reforming catalysts, attached electrolyte amounts and fuel gas compositions and the like. For example, in the embodiment 1, the activity retention rates (rates to fresh one) was improved from 5–10% to 60% after operating at the operating temperature lowered from 650° C. to 600° C. in the state of holding Ni/MgO catalysts for 8,000–10,000 hours. Thus, the reforming catalysts held in the low temperature operating parts 13$a$ and 13$b$ can keep enough activity in a long operate exceeding e.g. 10,000 hours. As the upper limit operating temperatures of the reforming catalysts differ on operating conditions, the upper limit operating temperatures are determined by the life tests of the reforming catalysts using temperatures as parameters and the activity evaluations of the reforming catalysts. For example, the Ni/MgO catalysts of the embodiment 1 is desired to be kept below 630° C. in case of taking aim at the operation time longer than 10,000 hours.

In the embodiment 1 shown in FIG. 3, the fuel gas and the oxidant gas are fed in the opposing flow formation. In this formation, the fuel gas entrance part becomes to be one of the low temperature operating parts (a first low temperature operating part) 13$a$ mainly with the advance of the internal reforming reactions. At the same time, the oxidant gas entrance part also becomes another low temperature operating part (a second low temperature part) 13$b$ by the cooling effect of the oxidant gas. The fuel gas mainly composed of methane and steam is reformed almost to an equilibrium state (for example to the equilibrium methane conversion 75–90%) in the first low temperature operating part 13$a$, then produced hydrogen is fed to cell reactions in rear flow fuel gas passages. Moreover, the hydrogen in the fuel gas is consumed by the cell reactions in a process of flowing through the fuel gas passages, and steam is produced. Consequently, the equilibrium methane conversion move to the decomposition side of the methane in the process of flowing through the fuel gas passages. On the other hand, when a fuel cell is being operated with a load in an ordinary operation condition (for example, a utilization factor being more than 80%, a central operating temperature being 650° C.), the equilibrium methane conversion becomes almost 100% in an atmospheric pressure operating condition when the fuel gas passed almost 50% of the total length of the fuel gas passages. And, because the second low temperature operating part 13$b$ ordinary is arranged in a region where the equilibrium methane conversion has already become almost 100%, the methane undecomposed in the first low temperature part 13$a$ is efficiently decomposed in the second low temperature operating part 13$b$. And the hydrogen produced the reforming reaction is fed to cell reactions at the same time.

By the way, produced temperature distribution patterns in a cell plane are different greatly between the gas-feeding formation (e.g. the parallel flow formation or opposed flow formation) in which the flow direction of the fuel gas and the flow direction of the oxidant gas are in a parallel relation like the embodiment 1 and the gas-feeding formation (e.g. the orthogonal flow formation) in which the both flow directions are in an orthogonal relation like the conventional fuel cell device shown in FIG. 1. That is, distributions of all factors causing temperature distributions such as cell reaction distributions, reforming distributions, cooling effect distributions of the oxidant gas and the like exist in only one direction (the flow direction of the reaction gas) in the parallel relation gas-feeding formation like the embodiment 1, hereby temperature distributions in the cell plane also becomes one-dimensional in the flow direction of the reaction gas. FIG. 4 is a view showing an example of a temperature distribution in the opposed flow formation. Accordingly, all fuel gasses pass both the first low temperature operating part 13$a$ and the second low temperature operating part 13$b$, and the 100% advance of reforming reactions can be expected over a long period in the embodiment 1.

Figure 9:
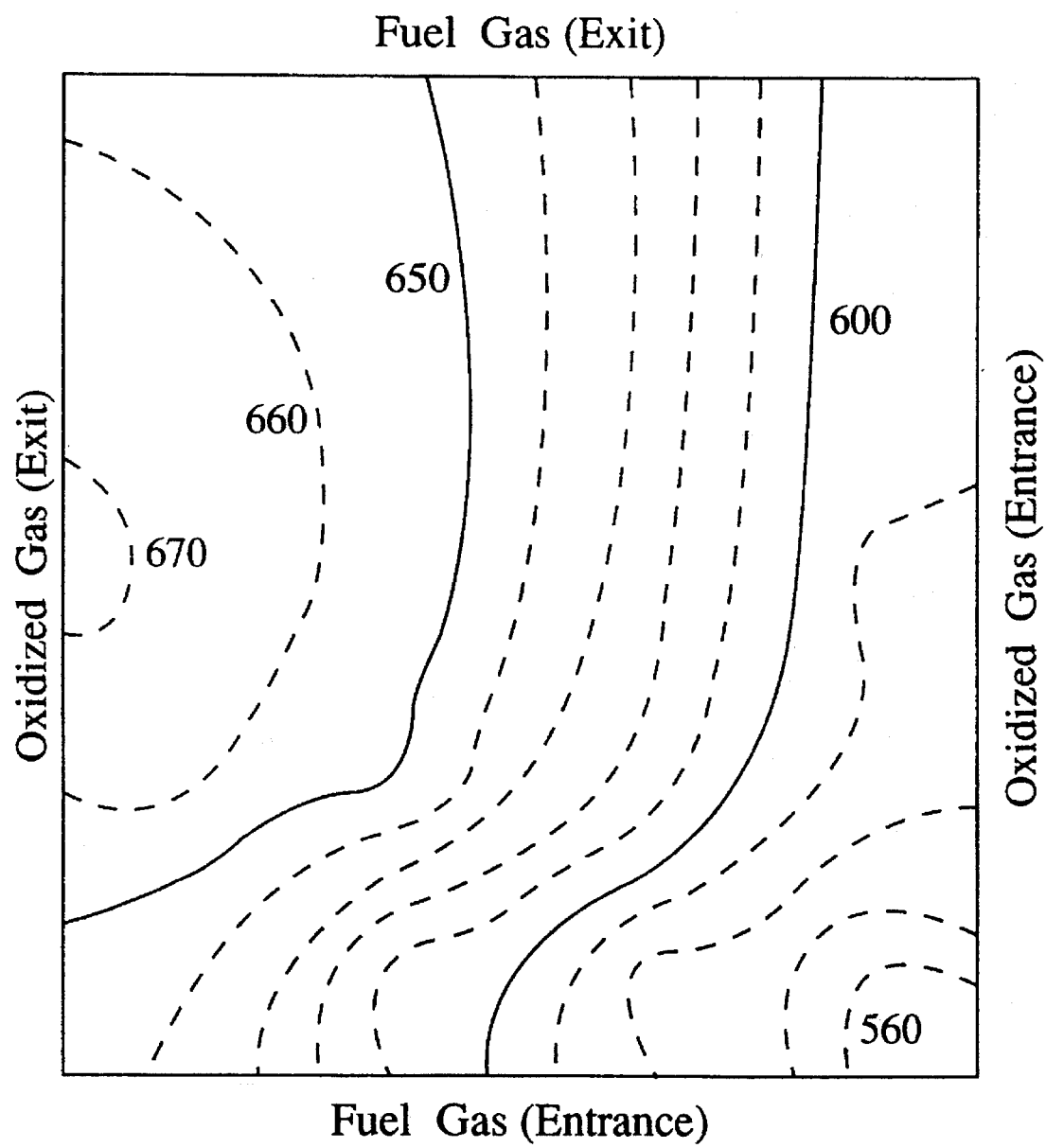
FIG. 9 is an illustrative view showing an example of a temperature distribution in a cell plane of an internal reforming type fuel cell device of the cross-flow-design.

On the other hand, in the conventional orthogonal relation gas-feeding formation, the distribution of the cell reaction is two-dimensional, and the distribution direction of the reforming reaction and the distribution direction of the cooling effect of the oxidant gas are orthogonal, and further the temperature distribution too becomes two-dimensional complicated patterns. FIG. 9 is a view showing an example of a temperature distribution in a cell plane of the orthogonal flow formation. As shown in the same FIG., relatively low temperature parts in the cell plane appear at the entrance part of the fuel gas and the entrance part of the oxidant gas. As mentioned above, the second low temperature operating part is desirable to be located behind the point where the fuel gas has passed about 50% of the fuel gas passages, but the second low temperature operating part becoming below for example 630° C. can be located only at the corner places from the entrance part of the oxidant gas to the exit part of the fuel gas in the example such as FIG. 9. Even if reforming catalysts are held in the fuel gas passages in the corner parts from the exit of the oxidant gas to the exit of the fuel gas, the advance of the activity deterioration of the reforming catalysts is rapid, so stable reforming reactions over a long period cannot be executed in this case.

To solve this problem in keeping the orthogonal relation in the flow direction of the reaction gas, for example, considerations of structures or cooling methods for lowering the temperature in the corner parts from the exit of the oxidant gas to the exit of the fuel gas in FIG. 9, or considerations to arrange the exit region of the fuel gas at the entrance region of the oxidant gas by making the fuel gas flow formation a return flow in keeping the flow direction of the oxidant gas in the state of FIG. 9 are required. By executing these considerations, the temperature distribution almost suited to the desired one can be obtained by adding further considerations such as adjusting the return rate of the fuel gas properly. But these considerations have a defect that the cell structure becomes complicated. As described above, to predict a temperature distribution is difficult, and to set the low temperature operating parts and to control temperatures also become complicated in the case where the directions of reaction gasses are in an orthogonal relation to each other like the conventional example shown in FIG. 1. However, these problems do not happen in the case where the flow direction of the fuel gas and the flow direction of the oxidant gas are in a parallel relation like the embodiment 1.

Besides, the structure where the flow directions of the reaction gasses are in an orthogonal relation has another problem. For example in case of FIG. 1, there occurs another temperature distribution in an orthogonal direction to the flow direction of the fuel gas. It is just as the case above described that the return path part of the fuel gas can be set as the second low temperature operating part further by making the fuel gas flow formation the return flow and by arranging the return path part of the fuel gas at the entrance side of the oxidant gas in FIG. 9. However, a detailed investigation of the temperature distribution in the second low temperature operating part of the return path part of the fuel gas manifests another temperature distribution in the orthogonal direction to the flow direction of the fuel gas. Regarding the entrance temperature and the exit temperature of the oxidant gas passing through the fuel cell device as for example 580° C. and 680° C. respectively, the temperature of the region adjacent to the going path is regarded to become about 630° C. contrary to the fact that the cell temperature in the oxidant gas entrance region is about 580° C. In such a temperature distribution pattern, there is a part of the fuel gas passing through only relatively high operating temperature parts in the low temperature operating part, too. Consequently, undecomposed methane becomes being exhausted by the activity deterioration of the reforming catalysts over a long period.

On the other hand, in the structure in which the flow direction of the oxidant gas and the flow direction of the fuel gas are in a parallel relation to each other, the temperature distribution in a cell plane is one-dimensional in the flow direction of the reaction gas, so there is no large temperature distribution in principle in the direction orthogonal to the flow direction of the fuel gas (except ones due to practical factors such as heat-loss from the stack surface and uneven distribution of the reactant gas). Accordingly, fuel gasses flow in any part are exhausted after they have experienced almost identical temperature distributions in the low temperature operating parts 13a and 13b. That is, all fuel gasses are exhausted at any operating time after touching equally the reforming catalysts having almost identical activities. Consequently, the differences of the methane conversion at the exit of the cell in the cell plane due to exhausting positions are small, and the availability of the low temperature operating parts 13a and 13b can be exhibited to their maximum.

Now the example provided with two low temperature operating parts 13a and 13b in the fuel cell device in the embodiment 1 shown in FIG. 3, but the number of low temperature operating parts is not restricted to two, and then there can be provided more than two low temperature operating parts.

Besides, the operating temperature of the low temperature operating part 13b is low enough in comparison with 630° C. by cooling effects of the oxidant gas, since the fuel gas and the oxidant gas are in the opposed flow relation in the embodiment 1 of FIG. 3. This is a desirable circumstance from the view point of the lives of the reforming catalysts. On the other hand, the temperature of the low temperature operating part 13a is kept in low by the advance of the reforming reactions, since the low temperature operating part 13a is the entrance part of the fuel gas. But the low temperature operating part 13a also an exit part of the oxidant gas, so the temperature of it can not be set to be so low as the temperature of the low temperature operating part 13b. Accordingly, the reforming catalysts existed in the low temperature operating part 13b is more profitable in their lives than the reforming catalysts existed in the lower temperature operating part 13a.

Next two methods are known for attaining more long life with the flow structure of the reaction gas shown in FIG. 3. The first method of the two is to consider temperature control methods or the structures of the cell in order that the operating temperature of the low temperature operating part 13a is lowered a little more. That is, the first method is attained, for instance, by separately providing another temperature control mechanism to the fuel cell device. The second method of the two is to provide separately another preparatory reforming part reforming preparatorily the hydrocarbon in the fuel gas inside or outside the fuel cell device in place of the low temperature operating part 13a, and to lead the fuel gas the reformation of which is almost completed in the preparatory reforming part to the fuel gas passages. The second method does not require the low temperature operating part 13a, the hydrocarbon (methane) not reformed yet in the preparatory reforming part is efficiently reformed completely in the low temperature operating part 13b by using steam produced by cell reactions.

Further, only one place of the low temperature operating part 13b is required in the cell plane, then it can be naturally set by setting the most low temperature part as the low temperature operating part 13b. Accordingly, a high performance fuel cell device can be obtained without lowering the average operating temperature of the fuel cell, and further long life can be obtained.

EMBODIMENT 2.

Figure 2:
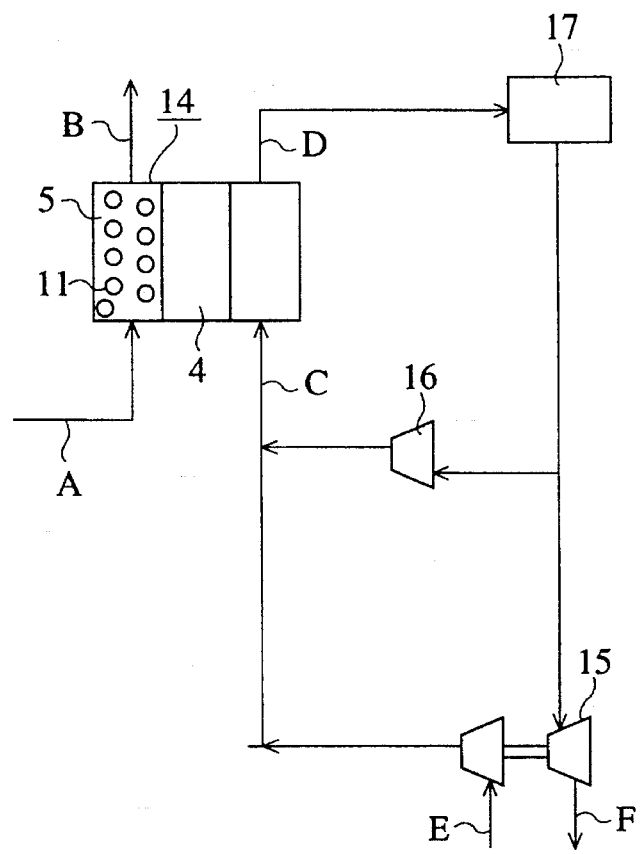
FIG. 2 is a block diagram illustrating a temperature-controlling method of a conventional internal reforming type fuel cell device.
Figure 5:
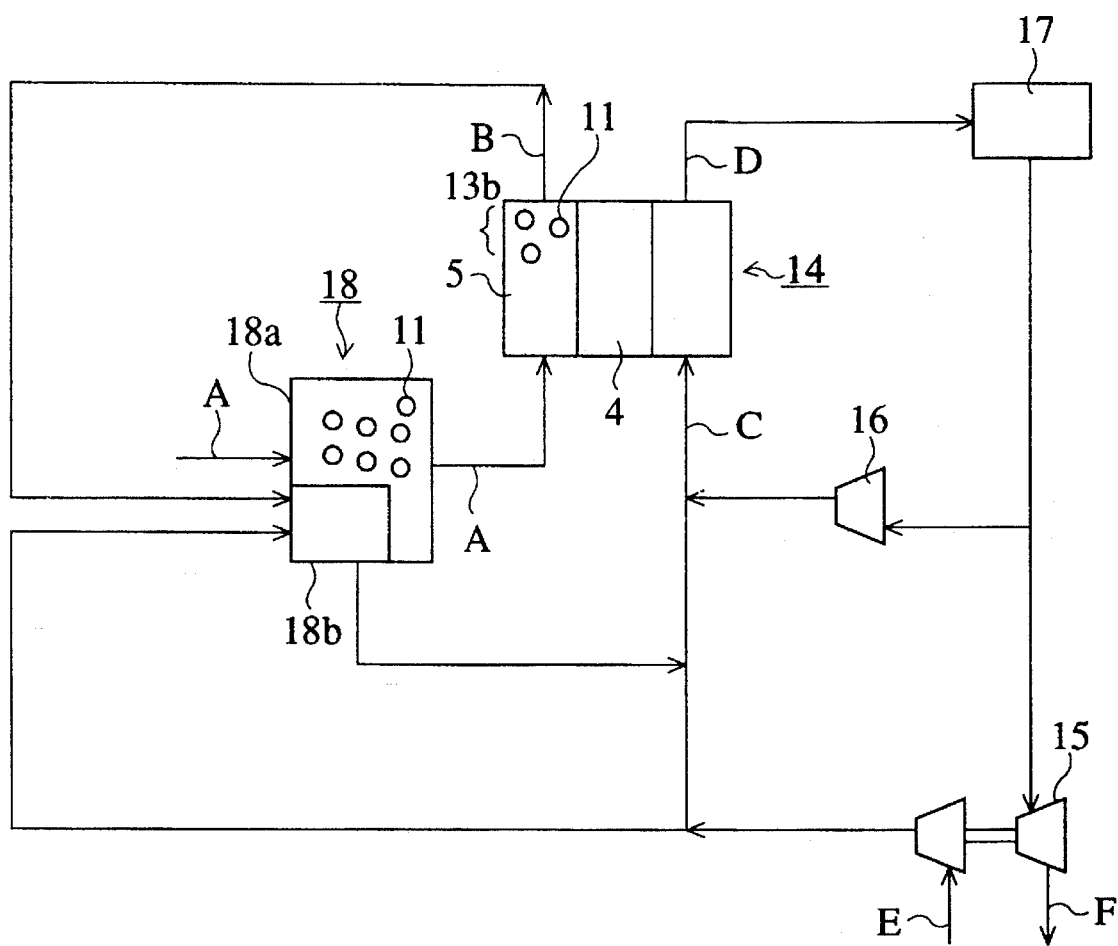
FIG. 5 is a system block diagram showing a system configuration of a fuel cell generating system of the present invention.

An embodiment 2 using a reforming reactor, generally known, as the preparatory reforming part of the second method described above is shown in FIG. 5. In FIG. 5, reference numeral 18 is a reforming reactor provided outside the fuel cell device 14, and the reforming reactor 18 holds reforming catalysts 11. The reaction heat of the reforming reactor 18 is fed from the outside. The reforming reactor 18 comprises a reforming reacting part 18a where the reforming reaction of a fuel gas is advanced and a heating part (a combustor) 18b for feeding reforming reaction heat to the reforming reaction part 18a. The heating part 18b combusts an unutilized fuel gas B exhausted from the fuel cell device 14, and the heating part 18b gives this combustion heat to the reforming reaction part 18a as reforming reaction heat. That is, the reforming reactor 18 functions as a preparatory reforming part, and a preparatorily reformed fuel gas A is fed to the fuel cell device 14. Undecomposed methane is contained in a part of the fuel gas fed, but the undecomposed methane is completely decomposed by the effects of the reforming catalysts 11 held in the low temperature operating part 13b while it is utilized in cell reactions in the fuel gas passages 5. Then the hydrogen produced by the decomposition is further utilized in the cell reactions. After that, the fuel gas fed to the fuel cell 14 is exhausted from the fuel cell device 14. Now, the structural components identical to those of the conventional fuel cell system of FIG. 2 are denoted the same reference numerals in FIG. 5, and the explanations of them are omitted.

Next, the operation of the embodiment 2 will be described. As the low temperature operating part 13b having a reforming function of methane is held in the fuel cell device 14, it is not necessary for the preparatory reforming part (the reforming reactor) 18 to reform all of the hydrocarbons. Accordingly, the preparatory reforming part 18 can be a low temperature type reforming part whose operating temperature is about 550°–700° C. of reaction temperature, and the methane conversion can be as low as 50–90%. From this reason, the preparatory reforming part 18 can utilize heat exhausted from the fuel cell device 14 as a major part of the reaction heat required to reforming reactions. From the view point above, the preparatory reforming part 18 will be a low temperature operating type reforming reactor. That is because the average operating temperature of the fuel cell device 14 is about 650° C., and because the maximum reforming reaction temperature also becomes about 650° C. on the assumption that the reforming reactions utilize the exhaust heat from the fuel cell device. The fuel cell generating system of the embodiment 2 is superior from the view point of the generating efficiency of the generating system. Besides, the fuel cell generating system in FIG. 5 has one more advantage. The preparatory reforming part 18 can be constructed with standard metal material of cheap price, because it is operated at a lower temperature comparing to the standard reforming reactors, which are usually operated at around 800° C. For instance, reacting tubes of the reforming reactor, generally operated in temperatures higher than 800° C., ordinary use 25/20 chromium and nickel centrifugally cast tubes. But in the invention more popular stainless materials can be used because the preparatory reforming part 18 is operated around 600° C. This is easily attained, for example, by making heat exchange in the reforming reactor 18 in use of a high temperature oxidized exhaust gas D to be exhausted from the fuel cell device 14. To put it more concretely, it can be easily attained for example by combining the heat exchanger 17 and the reforming reaction part 18a.

EMBODIMENT 3.

Further, arranging the preparatory reforming part inside the fuel cell device makes the reforming reactor needless, and then it makes possible to supply a more compact and cheaper fuel cell generating system. Moreover, arranging the preparatory reforming part in gas-leading fuel gas passages (for example in a gas seal part on the outer peripheral of the cell) makes it possible to arrange the preparatory reforming part without major change of the structure of the fuel cell device, and also it makes it possible to obtain a cheaper, more compact and highly reliable fuel cell device.

Figure 6:
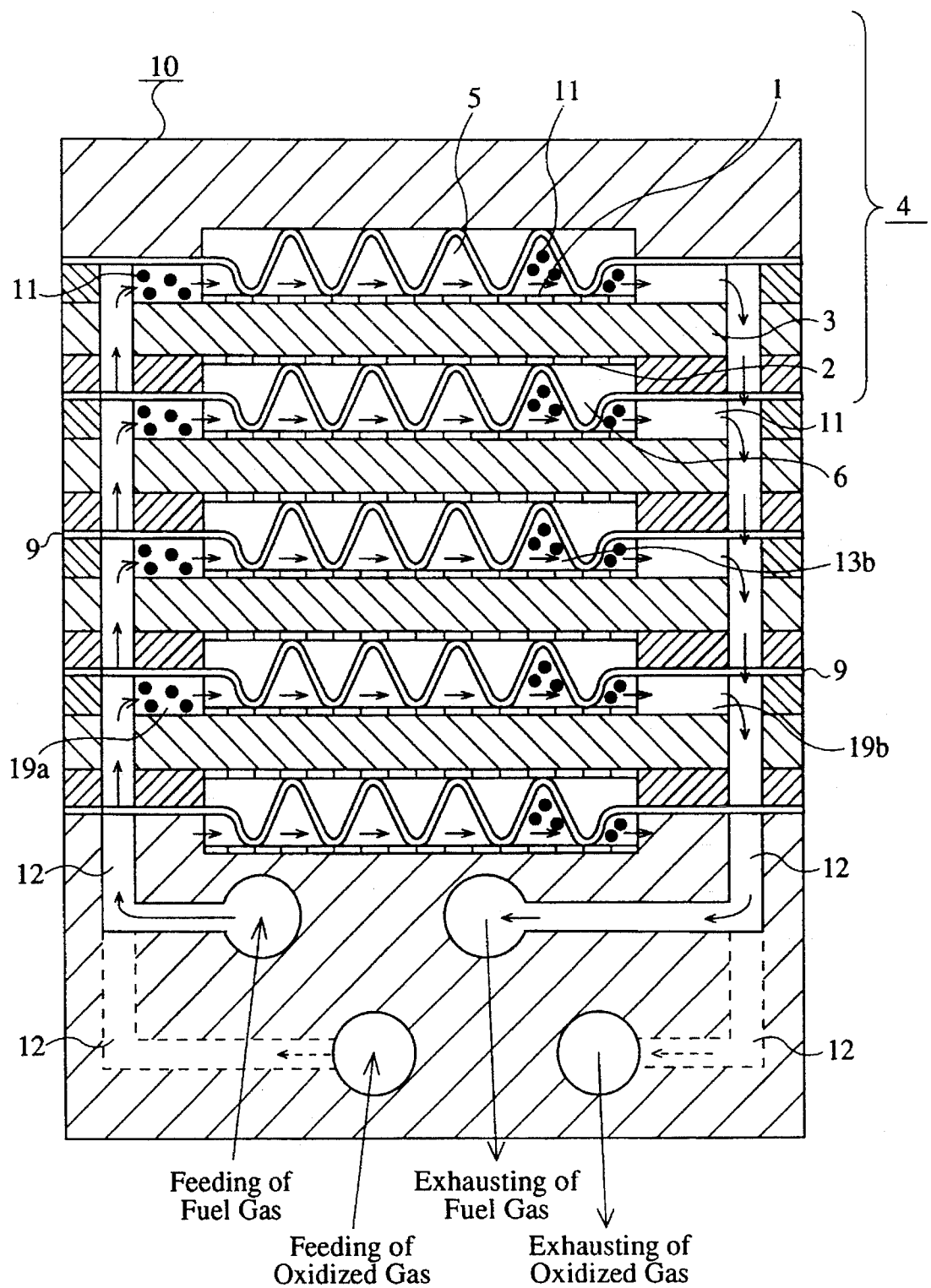
FIG. 6 is an enlarged view of the principal parts of the internal reforming type fuel cell device of the present invention.

An embodiment 3 in which the preparatory reforming parts are arranged in the gas-leading fuel gas passages (for example in the gas seal parts on the outer peripheral of the cells) of the conventional fuel cell device shown in FIG. 1 is shown in FIG. 6. FIG. 6 is a sectional view in the laminated layer direction of a fuel cell stack along the flow direction of the fuel gas. In FIG. 6, reference numerals 19a and 19b denote entrance side and exit side gas-leading fuel gas passages leading the fuel gas from the gas manifold 12 to the fuel gas passages 5. The fuel gas fed from the outside to the fuel cell device is fed to the entrance side gas-leading fuel gas passages 19a through the gas manifold 12. Because the entrance side gas-leading fuel gas passages 19a hold reforming catalysts inside, they function as preparatory reforming parts, and they preparatorily reform the hydrocarbons or alcoholic kinds in the fuel gas. The fuel gas being preparatorily reformed and containing undecomposed methane in a part of it is fed to the fuel gas passages 5. While the fuel gas, fed to the fuel gas passages 5 and containing the undecomposed methane in a part of it, is utilized in cell reactions in the flowing process through the fuel gas passage 5, the undecomposed methane of it is completely decomposed by the reforming catalysts held in the low temperature operating parts 13b. Then, the hydrogen produced by the decomposition is utilized in the cell reactions. After that, the fuel gas is exhausted through the exit side gas-leading fuel gas passages 19b and the exit side gas manifold 12. Now, the structural components identical or the same as those of the conventional fuel cell system of FIG. 1 are denoted the same reference numerals in FIG. 6, and the explanations of them are omitted. Generally speaking, the fuel gas fed to the fuel cell device does not contain electrolyte vapor. Further, it is possible to design the fuel cell stack 10 in order that the reforming catalysts 11 do not touch the fuel gas electrodes 1 containing the electrolyte in the entrance side gas-leading fuel gas passages 19a. Accordingly, the possibility of poisoning of the reforming catalysts 11 by the electrolyte vapor is small, so the operating temperatures of the entrance side gas-leading fuel gas passage 19 parts are not restricted by the upper operating temperature determined by the deterioration of the reforming catalysts.

EMBODIMENT 4.

Besides, along with utilizing the entrance side gas-leading fuel gas passages 19a as preparatory reforming parts, feeding reforming reaction heat required to the preparatory reforming parts from the exhausted heat produced in the fuel cell device makes it possible to obtain more efficient fuel cell device. Heating surfaces are required to execute such a heat feeding method, then it is important on designing to secure enough heating surfaces without making a fuel cell device structure complicated. On considering that almost all the exhausted heat of the fuel cell device generally is taken away by the oxidant gas and that the preparatory reforming parts are arranged at the entrance side gas-leading fuel gas passages 19a, employing such a structure as heat the entrance side gas-leading fuel gas passages 19a (preparatory reforming parts) with the hot oxidant gas through the separator plates 9 attains the above mentioned objects. To put it more concretely, such designing will do that the flow directions of the fuel gas and the oxidant gas are in a parallel relation (the parallel flow or the opposed flow formation), and that the entrance side gas-leading fuel gas passages passing the fuel gas and the gas-leading oxidant gas passages passing the oxidant gas adjoin each other through the separator plates 9 structurally. Hereby efficient heat exchange through the thin separator plates 9 can be attained by wholly using the conventional fuel cell structures and structural materials shown in FIG. 1 while sufficient heating surface area is sustained. In this case, heat exchange with the hot oxidant gas by the heat generated in the fuel cell device can be executed by arranging the entrance side gas-leading fuel gas passages 19a and the exit side gas-leading oxidant gas passages in a heat exchanging relation. Accordingly, efficient heat exchange can be obtained, and higher methane conversion can be attained in the entrance side gas-leading fuel gas passages (preparatory reforming parts).

Figure 7:
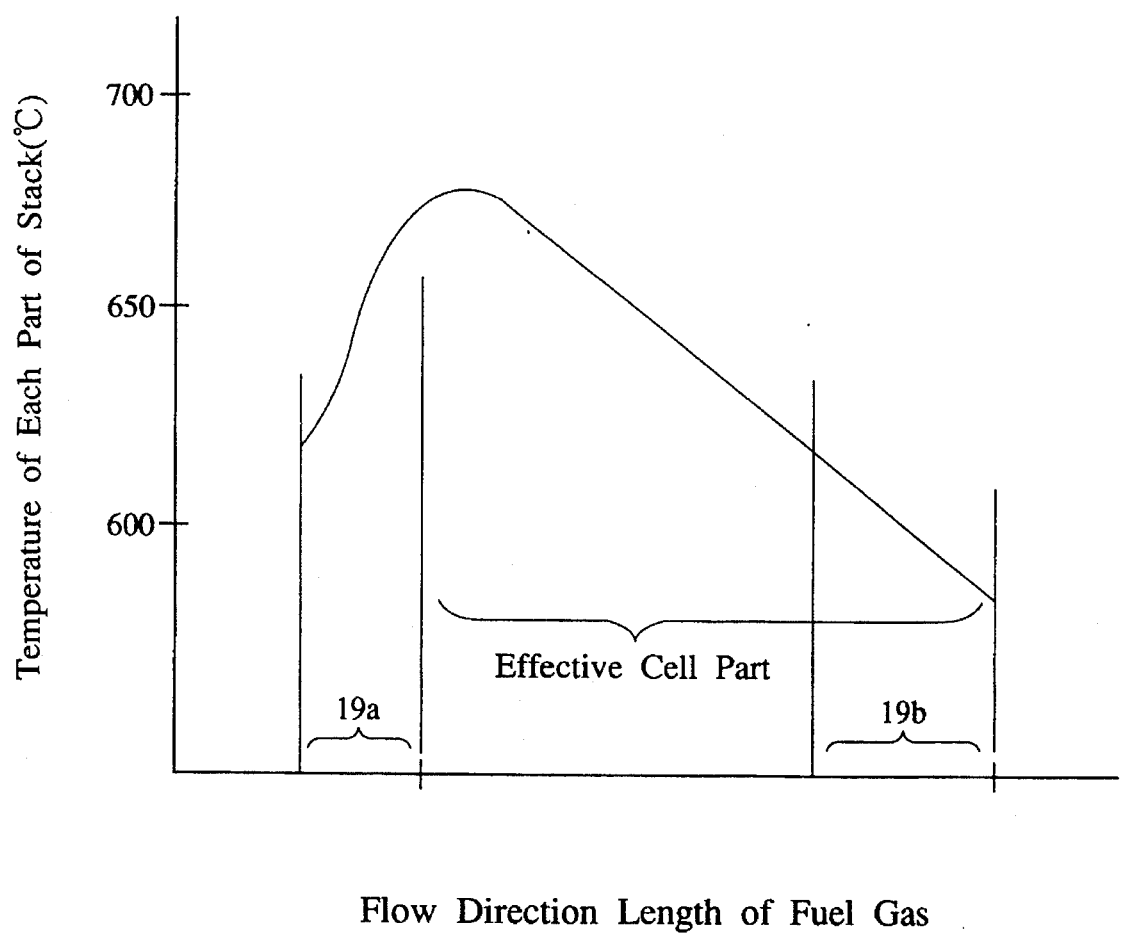
FIG. 7 is an illustrative view illustrating an example of a temperature distribution in a cell plane of the internal reforming type fuel cell device of the present invention.

A temperature distribution of the fuel gas flow direction in the embodiments 3 and 4 in the case where the flow directions of the fuel gas and the oxidant gas are made to be in an opposed relation is shown in FIG. 7. Being different from the operating temperature of the embodiment 1 shown in FIG. 4, the operating temperature of effective cell parts existed at the entrance parts of the fuel gas can be set high. Accordingly, the average operating temperatures of the cell become high and cell characteristics are improved. Comparing the temperature distribution (FIG. 7) of the embodiments 3 and 4 provided with the preparatory reforming parts in the entrance side gas-leading fuel gas passages 19a to the temperature distribution (FIG. 4) of the embodiment 1 not provided with the preparatory reforming parts, the average operating temperatures of the embodiment 3 and 4 rise by about 10° C. to that of the embodiment 1, and the average cell voltages of the embodiment 3 and 4 are improved by about 10 mV to that of the embodiment 1. At the same time, as the embodiments 3 and 4 do not need a particular structure as a reforming reactor and they can utilize the entrance side gas-leading fuel gas passages 19a formed in conventional fuel cell devices as the preparatory reforming parts, they have also a feature capable of being made in cheap. Besides, the embodiments 3 and 4 have also advantages of executing the reforming reactions by utilizing the exhaust heat produced in the fuel cell device, the advantages are brought by arranging the entrance side gas-leading fuel gas passages 19a at the positions where heat exchange with the hot oxidized exit gas is capable.

EMBODIMENT 5.

Moreover, the preparatory reforming parts are capable of being arranged inside the fuel cell device as, for example, plate state reforming reactors holding reforming catalysts inside. By doing this way, the cooling of the fuel cell device can be done effectively by the endothermic effects accompanied by the reforming reactions in the preparatory reforming parts. Besides, such considerations as coincide the endothermic plane of the reforming reactions advancing in the preparatory reforming parts with low temperature operating parts located inside the fuel cell device makes it also possible to keep the low temperature operating parts in low temperatures by the endothermic effects of the reforming reactions advancing in the preparatory reforming parts. By doing this way, the latitude of region setting of the low temperature operating parts in a cell plane becomes large, and setting the low temperature operating parts to the most suitable positions from the view points of cell characteristics, lives of reforming catalysts and reforming reactions is made to be possible.

As mentioned above, the embodiments 2–5 feed the reformed fuel gas to the fuel gas passages in the fuel cell device after preparatorily reforming hydrocarbons in the fuel gas, therefore the number of the low temperature operating parts to be located in the fuel cell device can be the minimum (one), and the setting of the low temperature operating parts can be done easily, and as a result an internal reforming type fuel cell device still long-lived and highly performed can be obtained.

EMBODIMENT 6.

Although the embodiments mentioned above concern one fuel cell stack respectively and the low temperature operating parts are provided in the fuel cell stack, making fuel cell devices' lives long and improving their characteristics can be attained also by connecting plural fuel cell device units in series in a flow direction of a fuel gas and setting the low temperature operating parts at appropriate parts in the fuel cell device unit group.

Figure 8A:
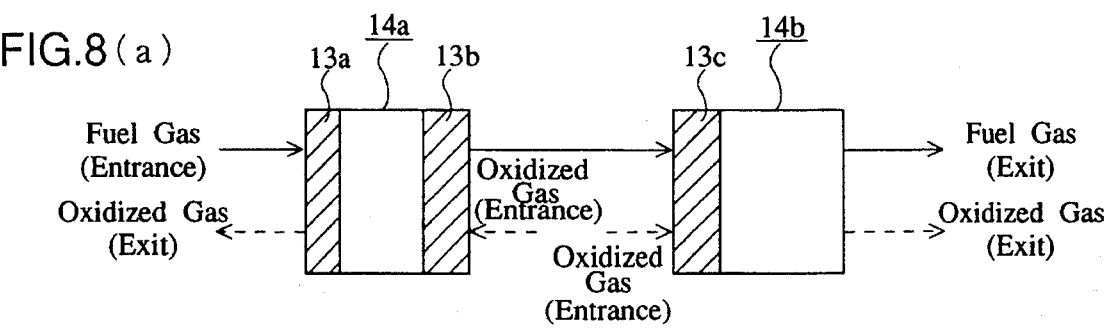
FIG. 8 (*a*), FIG. 8 (*b*) and FIG. 8 (*c*) are illustrative views illustrating from the embodiment 6 to the embodiment 8 of the internal reforming type fuel cell device of the present invention respectively.
Figure 8B:
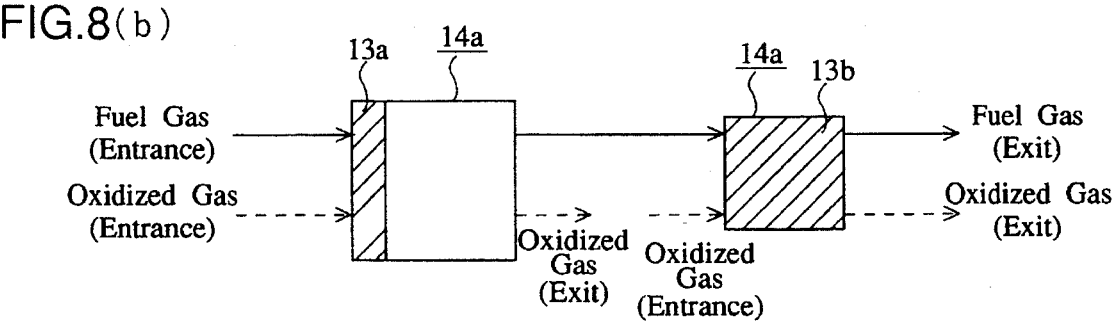
Figure 8C:
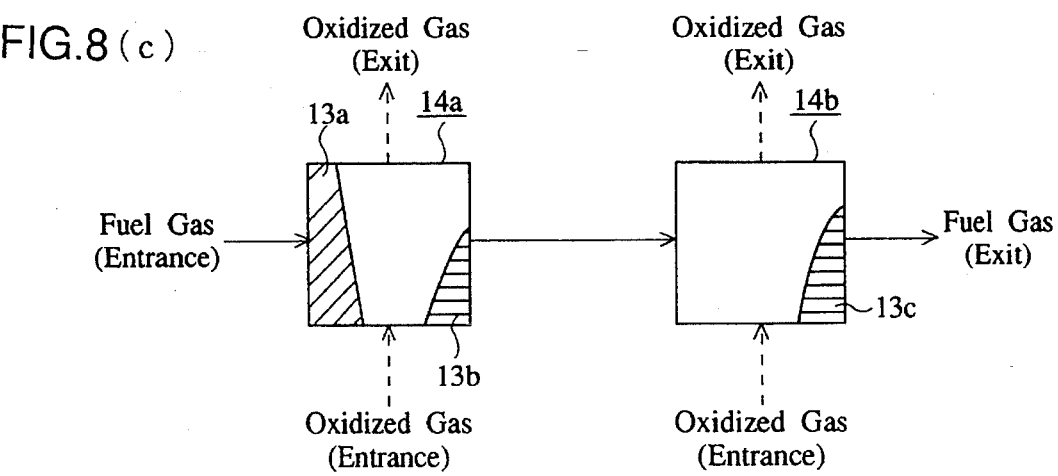

Hereinafter, the embodiment 6 will be described in connection with drawings. FIG. 8(a)–FIG. 8(c) are constitutional views of the embodiment 6 of the present invention. In FIG. 8(a), reference numerals 14a and 14b denote fuel cell device units and they are connected in series in the flow direction of the fuel gas. Reference numerals 13a, 13b and 13c denote low temperature operating parts arranged in the fuel cell device units 14a and 14b respectively.

Next, the operation of the embodiment 6 will be described. The fuel gas fed from the outside and containing hydrocarbons and alcoholic kinds is roughly reformed in the low temperature operating part 13a of the fuel cell device unit 14a being at the upper stream side in the fuel gas flow at first, then it is lead to downstream side fuel gas passages. In this case, hydrocarbons unreformed in the low temperature operating part 13a are completely reformed in the low temperature operating parts 13b and 13c with the aid of steam produced by cell reactions. Hydrogen produced by the reforming reactions is fed to the cell reactions in downstream side fuel gas passages. In the case where the low temperature operating part 13a corresponding to the entrance part of the fuel gas in the embodiment 6 is arranged in a gas-leading fuel gas passage which does not adjoin the fuel gas electrode 1 of FIG. 1 and which is electrochemically inert, it is needless to operate the low temperature operating part 13a at a low temperature as mentioned above.

The invention in which the low temperature operating parts are arranged at appropriate parts in the fuel gas passages in the plural fuel cell device units 14a and 14b like embodiment 6 is more superior in the following points than the inventions mentioned above in which the low temperature operating parts are arranged inside one fuel cell device. At first, considering temperature distributions in the fuel cell stack, low temperature parts inside the laminated body tend to appear at edge regions of the laminated body, that is the entrance part of an oxidant gas, the entrance and the exit parts of a fuel gas, and the like (as shown in FIG. 4, FIG. 7 and FIG. 9 as examples). The following points must be paid attention in order to obtain an internal reforming type fuel cell device whose cell characteristics are good and methane fed to which is decomposed completely to almost 100% and which is stable over long period of time by using reforming catalysts whose activities are stable and which are held at the low temperature operating parts of the fuel cell stack. That is, it is needed to reform the main part (for example about 50–90%) of the hydrocarbons (methane) contained in the fed fuel gas in the first low temperature operating part being the entrance part of the fuel gas, and then to reform again methane undecomposed in the first low temperature operating part with the reforming catalysts held in the second low temperature operating part by utilizing the steam produced by the cell reactions on the way of the fuel gas passages.

The reason to need some degree of the advancing of the reforming reaction at the entrance part of the fuel gas is that cell reactions require hydrogen in the fuel gas passages being the downstream side of the fuel gas passages and the concentration of the hydrogen in the fuel gas directly influences the cell voltage. Besides, the reason why 100% reforming reactions cannot be done in the first low temperature operating part is that the equilibrium methane conversion ratio at this part at the typical operating condition (650° C., 1 atm., steam-to-methane molar ratio is 2–4) is 0.8–0.95 and that methane conversion can not reach 100% methane conversion by the thermodynamic limitation. Accordingly, it is required for obtaining about near 100% methane conversion in the second low temperature operating part that the cell reactions of the fuel gas have already advanced to an appropriate degree before the fuel gas is fed to the second low temperature operating part, and that the fuel gas has contained the steam produced by the cell reactions. Now, setting the operating conditions so that the steam-to-methane molar ratio is 2.5 and that the operating temperature of the low temperature operating part is 610° C. and further that the operating pressure is at the atmospheric pressure, the fuel gas is required in order to get almost 100% methane conversion to have the cell reactions proceeded by more than 52% as a fuel gas utilization ratio before it is fed to the second low temperature part. Supposing that the fuel gas utilization ratio of whole fuel cell device are 80–85%, such a rate of the fuel gas utilization is ordinarily attained at the point where the fuel gas has passed 50–60% fuel cell electrode of the whole electrode in its area ratio. Accordingly, the second low temperature part is suitable to be arranged in the downstream fuel gas passages where the fuel gas has passed 50–60% fuel gas electrodes.

In case of providing the low temperature operating parts in one fuel cell device, the positions of the low temperature operating parts should be the edge region of the fuel cell device as mentioned above unless some special temperature-controlling mechanisms are provided. In order to arrange the low temperature operating parts at the rear half part of fuel gas passages with a simple fuel cell structure without making the flow method of the fuel gas complexed, the second low temperature operating part must be arranged in the exit part of the fuel gas as shown in FIG. 4 and FIG. 7. The hydrogen to be produced in the second low temperature part by the reforming of methane should be fed to cell reactions at fuel gas electrodes in downstream side from the second low temperature part. From the view point of cell characteristics, it is desirable that the second low temperature operating part is arranged at the capable uppermost side of the fuel gas passages, and that the reformed hydrogen is rapidly fed to the electrode side. The embodiment 6 of the present invention shown in FIG. 8(a) employs the structure of connecting plural fuel cell device units 14a and 14b in series in the flow direction of the fuel gas and arranging the second low temperature operating part at their suitable positions, therefore it can easily arrange the second low temperature operating part at the appropriate intermediate point of the fuel gas passages of the whole fuel cell device unit group without making the cell structure complexed. That is, it has a feature to be able to execute stable reforming reactions and to realize the fuel cell device whose cell characteristics are good and whose structure is simple. Further, since it connects plural fuel cell device units in series in the flow direction of the fuel gas, the fuel gas utilization rate per fuel cell device unit decreases. Accordingly, it has also an advantage being able to operate without bad influences on the cell characteristics even if the fuel gas is distributed somewhat inhomogeneously inside the fuel cell device unit or among the fuel cell device units.

EMBODIMENT 7.

Moreover, the embodiment 7 of FIG. 8(b) is arranged a low temperature operating part at all over one fuel cell device unit (fuel cell device unit 14b in FIG. 8(b)) independently. Employing this way makes it possible to separate the low temperature operating part 13b and to make it independent from other cell parts. Accordingly, the embodiment 7 has an advantage of being able to control the temperature of the low temperature operating part 13b independently from other cell parts. Besides, in case of introducing a structural mechanism, controlling the operating temperature of the low temperature operating part 13b, to the fuel cell device for the purpose of controlling the temperature of the low temperature operating part 13b precisely, designing and introducing the mechanism only to the fuel cell device unit 14b is sufficient. Then the embodiment 7 can suppress the system complexity to the minimum.

EMBODIMENT 8.

Moreover, FIG. 8(c) shows the embodiment 8 connecting the rectangular flow formation fuel cell device units, where a fuel gas and oxidant gasses intersect at right angles, in series in the fuel gas flow direction. The rectangular flow formation fuel cell device has a feature that its structure is simplest among all sorts of fuel gas flow formations and its manufacture is easy. On the other hand, it has problems that temperature distributions in a cell plane are complicated and that setting and controlling of low temperature operating parts are difficult, as mentioned above. Namely, the low temperature operating part 13b of the upper stream side fuel cell device unit 14a is located at the entrance side of the oxidant gas in the embodiment 8 like the temperature distribution in a cell plane of the rectangular flow formation internal reforming type fuel cell device explained in FIG. 9. Accordingly, the fuel gas flowing the fuel gas passages near the exit side of the oxidant gas is exhausted from the upper stream side fuel cell device unit 14a in low methane-conversion after long time operation. On the other hand, the fuel gas flowing the fuel gas passages in the regions near the entrance side of the oxidant gas can maintain stably high methane conversion (for example conversion more than 90%) over a long period of time. In the rectangular flow type fuel cell device unit, since a part of the fuel gas is exhausted from the fuel cell device unit without passing the second low temperature operating part in such a manner, the rectangular flow type fuel cell device had a fault that it cannot reform completely methane in case of a long time operate.

However, since the embodiment 8 of FIG. 8(c) is provided with the fuel cell device unit 14b at the downstream side, the methane undecomposed in the upper stream side fuel cell device unit 14a passes the low temperature operating part 13c of the downstream side fuel cell device unit 14b in a certain rate. Hereby, the improvement of the methane conversion is expected. Besides, in the embodiment 8 shown in the same Fig., the rate of the fuel gas which does not pass both of the low temperature operating parts, the low temperature operating part 13b of the upper stream side fuel cell device unit 14a and the low temperature operating part 13c of the downstream side fuel cell device unit 14b, is the multiplication of the rates of fuel gasses which do not pass respectively the low temperature operating parts 13b and 13c in each fuel cell device unit 14a and 14b. Accordingly, the rates of the fuel gasses not passing the low temperature parts can be decreased greatly by connecting the fuel cell units in series in the fuel gas flow direction. For example, supposing that the unreformed rate in the low temperature operating part 13a is 0.2, that the rate of the fuel gas not passing the low temperature operating part 13b in the fuel cell device unit 14a is 0.45, and that the rate of the fuel gas not passing the low temperature operating part 13c in the fuel cell device unit 14b is 0.35, the undecomposed rate becomes about 0.03 by the use of the structure of two steps of the fuel cell device shown in FIG. 8(c), while the undecomposed rate of the methane is estimated to be about 0.09 over a long period of time by the use of the structure of only one step of the fuel cell device. It is apparent that further multiplication of the steps makes it possible to decrease the undecomposed rate of the methane of whole fuel cell device.

As mentioned above, the embodiment 8 makes it possible to decrease greatly the rate of the fuel gas not passing the low temperature operating parts from the view point of whole fuel cell group and the embodiment 8 makes it possible to obtain a fuel cell device capable of executing stable reforming reactions practically over a long period of time by connecting plural similar fuel cell devices in series in the fuel gas flow direction even if a part of the fuel gas cannot pass the low temperature operating parts due to the restriction of the temperature distributions peculiar to the fuel cell devices. Consequently, the fuel cell device which is simple in structure and easy in manufacturing is made to be able to be operated over a long period of time.

As mentioned above, the internal reforming type fuel cell device of a first aspect of the present invention is constituted so as to touch a fuel gas to reforming catalysts arranged in low temperature operating parts, therefore the aspect of the present invention has such effects that it becomes possible to make the lives of the reforming catalysts utilizing temperature distributions in the fuel cell device long, and that the activity of the reforming catalysts is maintained for a long time without the sacrificing cell characteristics. Further, the internal reforming type fuel cell device of the aspect is constituted in order that the flow direction of the fuel gas and the flow direction of an oxidant gas is in a parallel relation or in an opposing relation, therefore the aspect of the present invention has such effects that the setting and the controlling of low temperature operating parts become easy, and that this invention realize most effectively the idea of making the life of the reforming catalysts long by operating them at relatively low temperature.

The internal reforming type fuel cell device of a second aspect of the present invention is constituted by connecting plural fuel cell device units in series in the fuel gas flow direction, and the internal reforming type fuel cell device is constituted to hold reforming catalysts in low temperature operating parts in at least one or more fuel cell device units, therefore the present invention has such advantages that the low temperature operating parts can be set at the most suitable positions from the view points of cell characteristics and reforming reactions without complexing the cell structures, and that the present invention can realize an internal reforming type fuel cell device stable over a long period of time with structurally simple fuel cell device units.

The internal reforming type fuel cell device of a third aspect of the present invention is constituted so as to introduce a fuel gas to a preparatory reforming part provided inside the fuel cell device and touch the fuel gas to the reforming catalysts arranged in a low temperature operating part after reforming the fuel gas in the preparatory reforming part, therefore the aspect of the present invention has such effects that only one lower temperature operating part to be set in a cell plane is required, and that the operating temperatures of the lower temperature operating part can be set naturally to lower temperatures without lowering average operating temperatures of the cell, and further that the aspect of the present invention is able to obtain a long life, high performance and compact internal reforming type fuel cell device.

The internal reforming type fuel cell device of a fourth aspect of the present invention is constituted to arrange reforming catalysts in fuel gas flowing spaces positioned at low temperature operating parts produced by the cooling effects of a preparatory reforming part, and to touch the fuel gas to the reforming catalysts positioned in the low temperature operating parts, therefore the aspect of the invention has such effects that the degree of freedom of region-setting of the low temperature operating parts in a cell plane is large, and that only one lower temperature operating part is required, and that the operating temperatures of the lower temperature operating parts can be set naturally to lower temperatures without lowering average operating temperatures of the cell, and further that the aspect of the present invention is able to obtain a long life, high performance and compact internal reforming type fuel cell device.

The internal reforming type fuel cell device of a fifth aspect of the present invention is constructed so as to execute reforming reactions of a fuel gas in preparatory reforming parts by utilizing exhausted heat produced in the fuel cell device, therefore the aspect of the present invention has such effects that only one low temperature operating part to be set in a cell plane is required, and that operating temperatures in the low temperature operating part can be set naturally to the low temperatures without lowering the average operating temperature of the cell, and further that efficient reformations utilizing exhausted heat can be executed, and moreover that the aspect of the present invention is able to obtain a long life, high performance and compact internal reforming type fuel cell device.

The internal reforming type fuel cell device of a sixth aspect of the present invention is constituted so as to be provided with a preparatory reforming part inside the entrance side gas-leading fuel gas passages, therefore the aspect of the present invention has such effects that a preparatory reforming part in a simple and highly reliable structure can be constituted, and that only one lower temperature operating part to be set in a cell plane is required, and that the operating temperatures of the low temperature operating part can be set to low temperatures naturally without lowering average operating temperature of the cell, and moreover that the aspect of the present invention is able to obtain a structurally simple, highly reliable, long life and high performance internal reforming type fuel cell device.

The internal reforming type fuel cell device of a seventh aspect of the present invention is constructed so as to execute reforming reactions at the preparatory reforming part positioned in an entrance-side gas-leading fuel gas passage by heat-exchanging with the hot oxidant gas flowing through gas-leading oxidant gas passages, therefore the aspect of the present invention has such effects that the neighboring gas-leading oxidant gas passages can be constituted in a simple and highly reliable structure, and that the reforming reactions can be done efficiently in the preparatory reforming part by utilizing the sensible heat held in the oxidant gas in the preparatory reforming part, besides that a low temperature operating part to be set in a cell plane is not required more than one in the plane, and that an operating temperature of the low temperature operating part can be set naturally to a low temperature without lowering the average temperature of the cell, and moreover that the aspect of the present invention is able to obtain a structurally simple, highly reliable, long life, high performance and highly efficient internal reforming type fuel cell device.

The fuel cell generating system of an eighth aspect of the present invention is constructed so as to introduce a fuel gas to a reforming reactor provided at the upper stream side of the fuel gas system of a fuel cell device, and to touch the fuel gas to reforming catalysts arranged at low temperature operating parts after reforming the fuel gas in the reforming reactor, therefore the aspect of the present invention has such effects that the low temperature operating part to be set in a cell plane is not required more than one place in the plane, and that an operating temperature can be set naturally to a low temperature without lowering the average temperature of the cell, and moreover that the aspect of the present invention is able to obtain a fuel cell generating system which can operate an internal reforming type fuel cell device in a long life and high performance state.

The fuel cell generating system of a ninth aspect of the present invention is constructed so as to feed reaction heat required to reforming reactions in a reforming reactor from the exhausted heat produced in a fuel cell device, therefore the aspect of the present invention has such effects that a low temperature operating part to be set in a cell plane is not required more than one place in the plane, and that an operating temperature can be set naturally to a low temperature without lowering the average temperature of the cell, besides that the reformation of a fuel gas can be executed efficiently by utilizing the exhausted heat, and moreover that the aspect of the present invention is able to obtain a fuel cell generating system which can operate an internal reforming type fuel cell device in a long life and high performance state.

While preferred embodiment of the present invention have been described using specific terms, such description is for illustrative purpose only, and it is to be understood that changes and variations may be made without departing from the spirit or scope of the following claims.

What is claimed is:

1. An internal reforming type fuel cell device comprising:
a fuel cell stack composed by laminating plural cells with separator plates, said cells respectively having a fuel gas electrode and an oxidant gas electrode opposing each other through an electrolyte layer,
fuel gas passages formed on either surfaces of said fuel gas electrodes or said separator plates,
oxidant gas passages formed on either surfaces of said oxidant gas electrodes or said separator plates and arranged so that an oxidant gas flow geometry is parallel to a flow geometry of said fuel gas passages, a plurality of reforming catalyst bodies held in a fuel gas flowing space positioned in a low temperature operating part,
a first gas manifold connected to the fuel cell device for feeding, distributing and exhausting a fuel gas; and
a second gas manifold connected to the fuel cell device for feeding, distributing and exhausting an oxidant gas.

2. An internal reforming type fuel cell device comprising plural fuel cell device units, each fuel cell device unit having:
a fuel cell stack composed by laminating plural cells with separator plates, said cells respectively having a fuel gas electrode and an oxidant gas electrode opposing each other through an electrolyte layer,
fuel gas passages formed on either surfaces of said fuel gas electrodes or said separator plates,
oxidant gas passages formed on either surfaces of said oxidant gas electrodes or said separator plates,
a first gas manifold connected to each fuel cell device unit for feeding, distributing and exhausting a fuel gas;
a second gas manifold connected to each fuel cell device unit for feeding, distributing and exhausting an oxidant gas; wherein
each of said fuel gas passage of said plural fuel cell device units is connected in series,
a low temperature operating part is provided to at least one of said fuel cell device units, and
a plurality of reforming catalyst bodies art held in a fuel gas flowing space positioned in said low temperature operating part.

3. An internal reforming type fuel cell device comprising:
a fuel cell stack composed by laminating plural cells with separator plates, said cells respectively having a fuel gas electrode and an oxidant gas electrode opposing each other through an electrolyte layer,
fuel gas passages formed on either surface of said fuel gas electrodes or said separator plates,
oxidant gas passages formed on either surfaces of said oxidant gas electrodes or said separator plates,
a plurality of reforming catalyst bodies held inside said fuel gas passages and arranged in parts of said fuel gas passages positioned in low temperature operating parts,
a first gas manifold connected to the fuel cell device for feeding, distributing and exhausting a fuel gas;
a second gas manifold connected to the fuel cell device for feeding, distributing and exhausting an oxidant gas, and
a preparatory reforming part for introducing said fuel gas to said fuel gas passages after reforming hydrocarbons or alcohols in said fuel gas fed from the first gas manifold.

4. An internal reforming-type fuel cell device comprising:
a fuel cell stack composed by laminating plural cells with separator plates, said cells respectively having a fuel gas electrode and an oxidant gas electrode opposing each other through an electrolyte layer,
fuel gas passages formed on either surfaces of said fuel gas electrodes or said separator plates,
oxidant gas passages formed on either surfaces of said oxidant gas electrodes or said separator plates,
a plurality of reforming catalyst bodies held inside said fuel gas passages and arranged in parts of said fuel gas passages positioned in low temperature operating parts,
a first gas manifold connected to the fuel cell device for feeding, distributing and exhausting a fuel gas;
a second gas manifold connected to the fuel cell device for feeding, distributing and exhausting an oxidant gas;
a preparatory reforming part to introduce said fuel gas to said fuel gas passages after reforming hydrocarbons or alcohols in said fuel gas fed from the first gas manifold and to keep said low temperature operating parts at low temperatures by reaction heat accompanied with the reaction of said reforming.

5. An internal reforming type fuel cell device comprising:

a fuel cell stack composed by laminating plural cells with separator plates, said cells respectively having a fuel gas electrode and an oxidant gas electrode opposing each other through an electrolyte layer, fuel gas passages formed on either surfaces of said fuel gas electrodes or said separator plates, oxidant gas passages formed on either surfaces of said oxidant gas electrodes or said separator plates, a plurality of reforming catalyst bodies held inside said fuel gas passages and arranged in parts of said fuel gas passages positioned in low temperature operating parts, a first gas manifold connected to the fuel cell device for feeding, distributing and exhausting a fuel gas;

a second manifold connected to the fuel cell device for feeding, distributing and exhausting an oxidant gas, and a preparatory reforming part for introducing said fuel gas to said fuel gas passages after reforming hydrocarbons or alcohols in said fuel gas fed from the first gas manifold by utilizing exhausted heat produced in a fuel cell reaction.

6. An internal reforming type fuel cell device comprising:

a fuel cell stack composed by laminating plural cells with separator plates, said cells respectively having a fuel gas electrode and an oxidant gas electrode opposing each other through an electrolyte layer, fuel gas passages formed on either surfaces of said fuel gas electrodes or said separator plates, oxidant gas passages formed on either surfaces of said oxidant gas electrodes or said separator plates, a plurality of reforming catalyst bodies held inside said fuel gas passages and arranged in parts of said fuel gas passages positioned in low temperature operating parts, a first gas manifold connected to the fuel Cell device for feeding distributing and exhausting a fuel gas;

a second gas manifold connected to the fuel cell device for feeding, distributing and exhausting an oxidant gas, an entrance side gas-leading fuel gas passage for leading said fuel gas from said first gas manifold to said fuel gas passages, and a preparatory reforming part for introducing said fuel gas to said fuel gas passages after reforming hydrocarbons or alcohols in said fuel gas fed from the first gas manifold by holding said plurality of reforming catalyst bodies in said entrance side gas-leading fuel gas passage.

7. An internal reforming type fuel cell device comprising:

a fuel cell stack composed by laminating plural cells with separator plates, said cells respectively having a fuel gas electrode and an oxidant gas electrode opposing each other through an electrolyte layer, fuel gas passages formed on either surfaces of said fuel gas electrodes or said separator plates, oxidant gas passages formed on either surfaces of said oxidant gas electrodes or said separator plates, a plurality of reforming catalyst bodies held inside said fuel gas passages and arranged in parts of said fuel gas passages positioned in low temperature operating parts, a first gas manifold connected to the fuel cell device for feeding, distributing and exhausting a fuel gas;

a second gas manifold connected to the fuel cell device for feeding, distributing and exhausting an oxidant gas, an entrance side gas-leading fuel gas passage for leading said fuel gas from said first gas manifold to said fuel gas passages, a gas-leading oxidant gas passage for leading said oxidant from said second gas manifold to said oxidant gas passages, or from said oxidant gas passages to said oxidant gas manifold, and a preparatory reforming part arranged in said entrance side gas-leading fuel gas passage for introducing said fuel gas to said fuel gas passages after reforming hydrocarbons or alcohols in said fuel gas fed from the outside, said preparatory reforming part capable of heat exchanging with said oxidant gas in said gas-leading oxidant gas passage.

8. A fuel cell generating system having a fuel cell device and a reforming reactor connected to a fuel gas system for feeding a fuel gas to said fuel cell device, wherein said fuel cell device comprises:

a fuel cell stack composed by laminating plural cells with separator plates, said cells respectively having a fuel gas electrode and an oxidant gas electrode opposing each other through an electrolyte layer, fuel gas passages formed on either surfaces of said fuel gas electrodes or said separator plates, oxidant gas passages formed on either surfaces of said oxidant gas electrodes or said separator plates, a plurality of reforming catalyst bodies held inside said fuel gas passages positioned in low temperature operating parts, a first gas manifold connected to the fuel cell device for feeding, distributing and exhausting a fuel gas; and a second gas manifold connected to the fuel cell device for feeding, distributing and exhausting an oxidant gas.

9. A fuel cell generating system having a fuel cell device and a reforming reactor connected to a fuel gas system for feeding a fuel gas to said fuel cell device, said reforming reactor fed exhausted heat produced at said fuel cell device, wherein said fuel cell device comprises:

a fuel cell stack composed by laminating plural cells through separator plates, said cells respectively having a fuel gas electrode and an oxidant gas electrode opposing each other through an electrolyte layer, fuel gas passages formed on either surfaces of said fuel gas electrodes or said separator plates, oxidant gas passages formed on either surfaces of said oxidant gas electrodes or said separator plates, a plurality of reforming catalyst bodies held inside said fuel gas passages positioned in low temperature operating parts, a first gas manifold connected to the fuel cell device for feeding, distributing and exhausting a fuel gas; and a second gas manifold connected to the fuel cell device for feeding, distributing and exhausting an oxidant gas.

10. The internal reforming type fuel cell device according to claim 1, wherein the low temperature operating part includes a first section having a first portion of the plurality of the reforming catalyst bodies and a second section having a second portion of the plurality of the reforming catalyst bodies, the first section and the second section being separated by a third section having no catalyst bodies.

11. The internal reforming type fuel cell device according to claim 2, wherein the low temperature operating part includes a first section having a first portion of the plurality of the reforming catalyst bodies a second section having a second portion of the plurality of the reforming catalyst bodies, the first section and the second section being separated by a third section having no catalyst bodies.

12. The internal reforming type fuel cell device according to claim 3, wherein the preparatory reforming part converts from about 50% to about 90% of the fuel gas.

13. The internal reforming type fuel cell device according to claim 6, wherein the plurality of reforming catalyst bodies have a reforming catalyst deterioration temperature and the entrance side gas-leading fuel passage has an operating temperature, the operating temperature of the entrance side gas-leading fuel gas passage being independent of the reforming catalyst deterioration temperature.

14. An internal reforming type fuel cell device, comprising:

- a fuel cell stack composed by laminating plural cells with separator plates, said cells respectively having a fuel gas electrode and an oxidant gas electrode opposing each other through an electrolyte layer;
- fuel gas passages formed on either surfaces of said fuel gas electrodes or said separator plates;
- oxidant gas passages formed on either surfaces of said oxidant electrodes or said separator plates and arranged so that an oxidant gas flow geometry is parallel to a flow geometry of said fuel gas passages;
- a plurality of reforming catalyst bodies held inside said fuel gas passage and arranged in parts of said fuel gas passages positioned in low temperature operating parts;
- a first gas manifold connected to the fuel cell device for feeding, distributing and exhausting a fuel gas;
- a second gas manifold connected to the fuel cell device for feeding, distributing and exhausting an oxidant gas; and
- a preparatory reforming part for introducing said fuel gas to said fuel gas passages after reforming hydrocarbons or alcohols in said fuel gas fed from the first gas manifold.

15. The internal reforming type fuel cell device according to claim 14, wherein the low temperature operating part includes a first section having a first portion of the plurality of the reforming catalyst bodies and a second section having a second portion of the plurality of the reforming catalyst bodies, the first section and the second section being separated by a third section having no catalyst bodies.

16. The internal reforming type fuel cell device according to claim 14, wherein the preparatory reforming part converts from about fifty percent to about ninety per cent of the fuel gas.

17. A fuel cell, comprising:

- an electrolyte layer having a first surface and a second surface;
- a fuel gas electrode having surfaces, the fuel gas electrode being disposed along the first surface of the electrolyte layer;
- an oxidant gas electrode having surfaces, the oxidant gas electrode being disposed along the second surface of the electrolyte layer;
- a fuel gas passage disposed along the surfaces of the fuel gas electrode, the fuel gas passage having low temperature portions;
- a plurality of reforming catalyst bodies disposed within the low temperature portions of the fuel gas passage;
- an oxidant gas passage disposed along the surfaces of the oxidant gas electrode;
- a first gas manifold connected to the fuel cell for feeding, distributing and exhausting a fuel gas;
- a second gas manifold connected to the fuel cell for feeding, distributing and exhausting an oxidant gas; and
- a preparatory reforming portion disposed adjacent to the fuel gas passage, the preparatory reforming portion being capable of introducing a reformed hydrocarbon or a reformed alcohol to the fuel gas passage.

18. The fuel cell according to claim 17, wherein the low temperature portion includes a first section having a first portion of the plurality of the reforming catalyst bodies and a second section having a second portion of the plurality of the reforming catalyst bodies, the first section and the second section being separated by a third section having no catalyst bodies.

19. The fuel cell according to claim 17, wherein the preparatory reforming portion reforms from about fifty percent to about ninety per cent of the fuel gas.

20. The fuel cell according to claim 17, wherein the preparatory reforming portion keeps the low temperature portions at low temperatures by reaction heat accompanied with the reforming reaction.

* * * * *